United States Patent
Deen et al.

(10) Patent No.: US 10,210,889 B1
(45) Date of Patent: Feb. 19, 2019

(54) MONOLITHICALLY-INTEGRATED HYBRIDIZED SLIDER ELECTRONICS FOR MAGNETIC READ/WRITE

(71) Applicant: Seagate Technology LLC, Cupertino, CA (US)

(72) Inventors: David A. Deen, Edina, MN (US); Taras G. Pokhil, Arden Hills, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/720,689

(22) Filed: Sep. 29, 2017

(51) Int. Cl.
| | |
|---|---|
| *G11B 5/60* | (2006.01) |
| *G11B 5/31* | (2006.01) |
| *G11B 5/39* | (2006.01) |
| *G11B 5/48* | (2006.01) |
| *G11B 5/58* | (2006.01) |
| *G11B 5/40* | (2006.01) |

(52) U.S. Cl.
CPC .......... *G11B 5/3103* (2013.01); *G11B 5/3903* (2013.01); *G11B 5/40* (2013.01); *G11B 5/48* (2013.01); *G11B 5/58* (2013.01); *G11B 5/6064* (2013.01)

(58) Field of Classification Search
None
See application file for complete search history.

(56) References Cited

U.S. PATENT DOCUMENTS

| | | | | |
|---|---|---|---|---|
| 4,605,977 | A * | 8/1986 | Matthews | G11B 5/6058 360/234.7 |
| 5,587,857 | A | 12/1996 | Voldman et al. | |
| 6,785,086 | B1 * | 8/2004 | Bonin | G11B 5/5552 360/78.05 |
| 6,859,346 | B1 * | 2/2005 | Meyer | G11B 5/17 360/234.7 |
| 6,870,709 | B2 * | 3/2005 | Shimanouchi | G11B 5/6005 360/294.4 |
| 7,327,639 | B2 * | 2/2008 | Jang | B82Y 10/00 369/112.27 |
| 7,450,342 | B2 | 11/2008 | White et al. | |
| 7,849,585 | B1 * | 12/2010 | Meyer | G11B 5/5552 29/603.12 |
| 8,631,561 | B2 * | 1/2014 | Bonhote | G11B 5/105 29/603.03 |

(Continued)

FOREIGN PATENT DOCUMENTS

| | | | | |
|---|---|---|---|---|
| JP | 62012917 | A * | 1/1987 | ............. G11B 5/105 |
| JP | 62149016 | A * | 7/1987 | |

(Continued)

*Primary Examiner* — William J Klimowicz
(74) *Attorney, Agent, or Firm* — Holzer Patel Drennan (57) ABSTRACT

Implementations described and claimed herein include a method for manufacturing monolithically-integrated on-slider hybridized electronics for magnetic read/write. The method includes forming a slider body, excising a void in a surface of the slider body, monolithically integrating an electronic block into the void of the slider body, polishing the surface of the slider body, and depositing functional layers on the surface of the slider body. By integrating electronics in close proximity to transducers, operational performance and functionality may be gained.

19 Claims, 6 Drawing Sheets

(56) References Cited

U.S. PATENT DOCUMENTS

| | | | |
|---|---|---|---|
| 2004/0160693 A1* | 8/2004 | Meyer | G11B 5/596 360/31 |
| 2011/0080670 A1 | 4/2011 | Gubbins et al. | |
| 2011/0116193 A1 | 5/2011 | Gubbins et al. | |
| 2017/0337941 A1* | 11/2017 | Xiao | G11B 5/11 |
| 2018/0040344 A1* | 2/2018 | Hutchinson | G11B 5/6082 |

FOREIGN PATENT DOCUMENTS

| | | | | |
|---|---|---|---|---|
| JP | 01201810 A | * | 8/1989 | G11B 5/127 |
| JP | 04358340 A | * | 12/1992 | |
| JP | 06243425 A | * | 9/1994 | |
| JP | 08167115 A | * | 6/1996 | |
| JP | 2924683 B2 | * | 7/1999 | |
| JP | 2001230464 A | * | 8/2001 | |
| JP | 2008059645 A | * | 3/2008 | G11B 5/314 |

\* cited by examiner

MONOLITHICALLY-INTEGRATED HYBRIDIZED SLIDER ELECTRONICS FOR MAGNETIC READ/WRITE

BACKGROUND

In data processing systems, magnetic disc drives are used as direct access storage devices. In such devices, read/write heads are used to write data on or read data from an adjacently rotating hard or flexible disk. A transducing head carried by a slider is used to read from and write to a data track on a disc. The slider is carried by a head arm assembly that includes an actuator arm and a suspension assembly, which can include a separate gimbal structure or can integrally form a gimbal. As the disc is spun, the slider glides above the surface of the disc on a small cushion of air. The actuator arm movably positions the slider with respect to the disc. Electrical connections extend along the suspension to electrically connect the transducing head to components located at or near the actuator arm. Those electrical connections can be formed on the suspension itself, or can be located on a separate interconnect structure supported relative to the suspension, such as a flex-on suspension.

SUMMARY

Implementations described and claimed herein provide a method for manufacturing monolithically-integrated on-slider hybridized electronics for magnetic read/write. The method includes forming a slider body, excising a void in a surface of the slider body, monolithically integrating an electronic block into the void of the slider body, polishing the surface of the slider body including a surface of the electronic block, and depositing functional layers on the surface of the slider body including the surface of the electronic block. By integrating electronic in close proximity to transducers, operational performance and functionality may be gained.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTIONS

As the reader/writer structures on a slider downscale with the demand for increased areal density capability (ADC), external connections to downstream electronics become more critical in terms of signal speed and distortion mitigation. As reader pulse-width response is improved for higher ADC drives, the frequency response of the signal chain must commensurately allow for minimization of signal degradation at high frequency, either by reducing connection lengths to active electronics or the implementation of specialized matching, filter, or active electronics networks.

In the case of multi-sensor magnetic recording (MSMR) technology has necessitated additional slider content such as contact pads, leads, and other elements. These elements are necessary to connect the multiple read heads to the flex on suspension (FOS)/preamplifier. This additional content introduces increased and undesirable parasitic capacitance, resistance, and inductance in the interconnect lines due to geometrical constraints. These "parasitics" cause deleterious effects at a high frequency (data rate), such as signal degradation. An example of one of these parasitic effects is the lower lead for the top reader in an MSMR read head. The lower lead must be thin (and subsequently higher resistance) to physically fit in the space between the top and bottom reader. Moreover, the answer to the demand for greater linear density within the MSMR context is additional readers. Thus, as the number of readers integrated on a single slider increases, the number and impact of the parasitic elements will also increase.

Transversely, if an advanced reader technology is employed whereby frequency detection is the modus operandi then analog processing electronics (e.g., a pre-amplifier, comparators, etc.) must be employed for the first time which have their own connection requirements and/or constraints. In the examples provided, additional drive content, namely the addition of application-specific electronics, becomes necessary. The additional drive content consumes volume and has the performance requirement that being positioned in close proximity to the read and write elements is preferred.

The disclosed technology includes monolithically integrating various electronics into a slider body to advance reader and writer technology. In response to the demand of higher ADC and therefore, reduced transducer dimensions, the proposed concept enables various electronics to be inserted into the slider body prior to transducer fabrication. By positioning these electronics in close proximity to the transducers, operational performance and/or functionality is gained.

Figure 1:
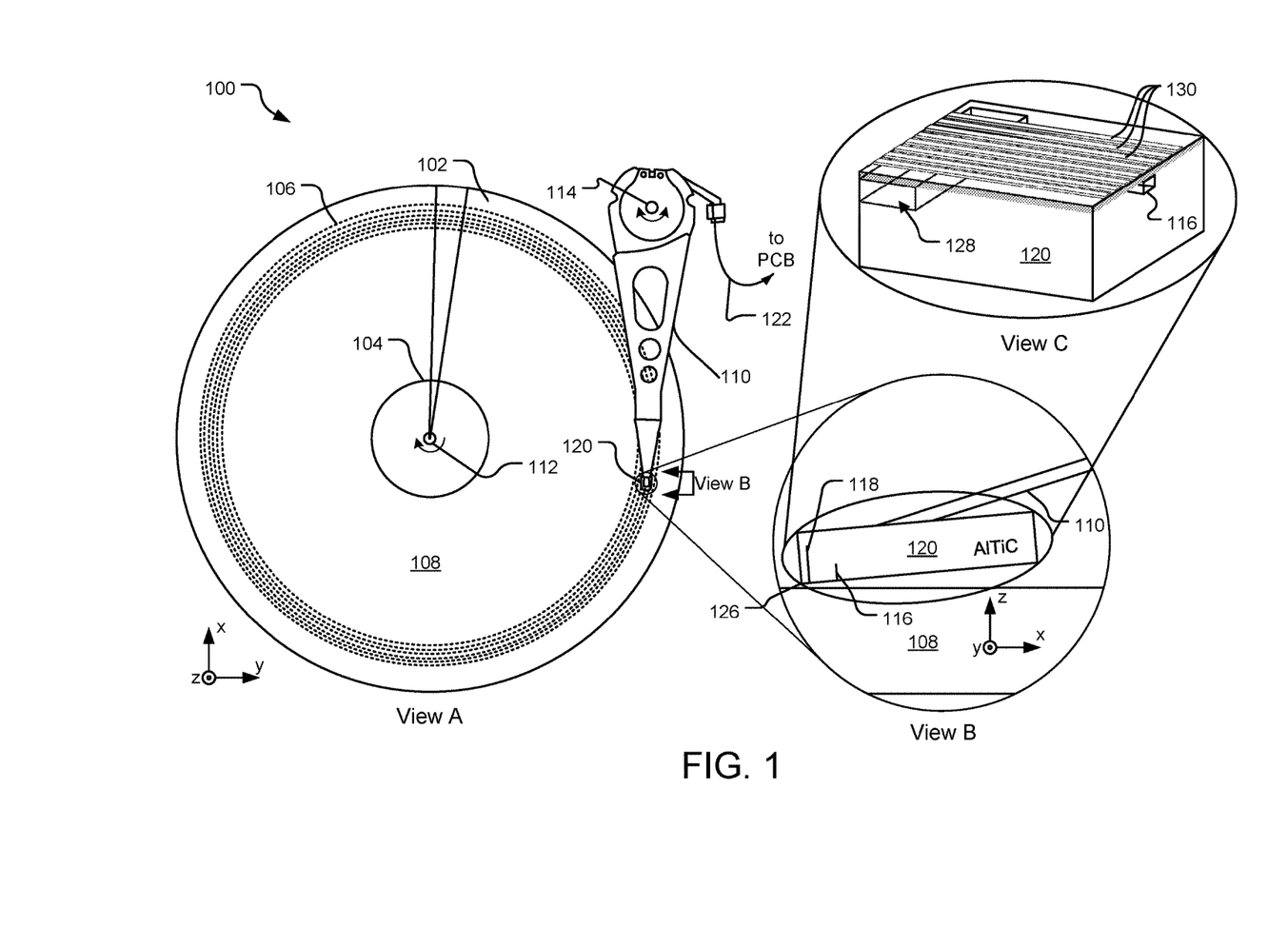
FIG. 1 illustrates an example disk drive assembly including a slider body with monolithically integrated electronics.

FIG. 1 illustrates an example disk drive assembly 100 including a slider body with monolithically integrated electronics. In FIG. 1, the disk drive assembly 100 includes an electronic block 128 configured within a slider body 120 located at a distal end of an actuator arm 110 and positioned over a storage medium disk surface 108 in the disclosed technology. The appearances of the slider body 120 and other features of assembly 100 in FIG. 1 are for illustration purposes only and not drawn to scale.

Referring specifically to View A (x-y plane), the disk surface 108 includes an outer diameter 102 and an inner diameter 104 between which are a number of substantially circular data tracks (e.g., track 106) illustrated by circular dotted lines. In one implementation, the disk surface 108 rotates at a high speed about disk axis of rotation 112 as information is written to and read from the data tracks on the disk surface 108. Further, the disk rotation speed may be fixed or variable.

Information may be written to and read from the disk surface 108 through the use of the actuator arm 110. The actuator arm 110 rotates about an actuator axis of rotation 114 during a seek operation to located a desired data track and sector on the disk surface 108. Specific locations on the media disk surface 108 may defined by any available addressing scheme. Example schemes include cylinder-head-sector (CHS) addressing and logical block addressing (LBA) schemes. The actuator arm 110 extends toward the disk surface 108 and the slider body 120 is located at the distal end of the actuator arm 110. The slider body 120 flies in close proximity above the disk surface 108 while reading and writing data to the disk surface 108. In other implementations, there is more than one slider body 120, actuator arm 110, and/or disk surface 108 in the disk drive assembly 100.

A flex cable 122 provides the requisite electrical connection paths from a printed circuit board (PCB, not shown) to electronic components attached to the slider body 120 (e.g., a read element 116 and a write element 118 shown in View B) while allowing pivotal movement of the actuator arm 110 during operation. The flex cable 122 may be routed along the actuator arm 110 from the PCB to the slider body 120. The PCB may include circuitry (e.g., a preamplifier) for controlling the write currents applied to the write element 118 during a write operation and amplifying read signals generated by the read element 116 during a read operation, for example.

A side view of the slider body 120 is shown in detail in View B of the x-z plane of FIG. 1. The slider body 120 is located at a distal end of an actuator arm 110 and positioned over a storage medium disk surface 108. In some implementations, electronic components integrated in the slider body 120 may be located mounted near the trailing edge 126 or on other areas of the slider body 120, as shown in View C. The read element 116 and the write element 118 are also shown in View B.

A perspective view of the slider body 120 is shown in detail in View C. The slider body 120 includes an electronic block 128 monolithically integrated into a void in the slider body 120. The void is cut out of the body of the slider body 120 prior to transducer (e.g., reader/writer) fabrication. The electronic block 128 may be monolithically integrated into the transducer by a bonding process or other attachment process. The processes of manufacturing are described in more detail in FIGS. 2, 3, and 5. View C also shows leads 130, which connect the reader 116 to the electronic block 128.

The electronic block 128 may be made of different components depending on the desired implementation. The electronic block may include, without limitation, a reader or buffer amplifier/transistor, a writer amplifier/transistor, and passive matching networks that match the reader or writer impedance to the loaded FOS impedance. The electronic block may include conjugate matching (L-matching) networks. The electronic block may include a quarter wave transformer. The electronic block may include a switching and/or multiplexing network for MSMR or selectable dual reader (SDR) architectures, for example, where lead and pad space may be limited. The electronic block may include switching between reader and writer transducers, frequency detection electronics (frequency comparator, oscillator, etc.), and channel electronics (signal conditioning or processing) that may have advantages being closer to transducers.

In another example, the electronic block may include an analog-based frequency detection electronics for advanced reader technology, such as spin-torque oscillator-based readers. In another example, the electronic block may include correction circuitry for non-linearities or other signal distortions. In another example, the electronic block may include reader buffer circuitry (e.g., emitter/source follower, etc.). In yet other examples, the electronic block may include other variants of impedance matching networks (e.g., a quarter-wave transformer, a tapered transmission line, a microstrip network, etc.). Other compositions of the electronic block are contemplated.

The signal chain for both reader and writer includes a transducer element connected through metallic leads to bond pads attached to a transmission line that couple downstream electronics (reader pre-amplifier and a bias circuit or writer driver) to the transducers. To mitigate against data transmission losses due parasitic-influenced signal degradation along signal lines, downstream electronics may be positioned in closer proximity to the transducers. Alternatively, the addition of application-specific circuitry integrated into the slider body enables advanced functionality of the entire transducer circuit. The disclosed technology achieves this through a prefabricated circuit block that is embedded into the slider body prior to reader/writer deposition and fabrication. The concept may include, but is not limited to, Si-based electronics fabricated on a Si substrate, diced, and physically bonded into the slider body prior to the magnetic device processes.

Figure 2A:
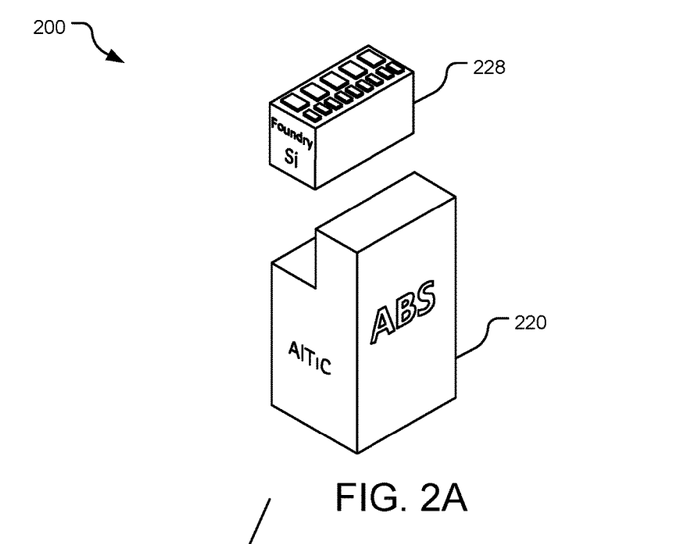
FIGS. 2A-C are schematic diagrams of an example slider body with monolithically integrated electronics during assembly.

FIGS. 2A-C illustrates schematic diagrams 200 of an example slider body with monolithically integrated electronics during assembly. FIG. 2A illustrates a slider body 220 that has been etched or notched on a surface and a side surface for a void in which to embed electronics. In the implementation in FIG. 1, the slider body 220 is an AlTiC substrate. In other implementations, the slider body 220 may include other compositions. An electronic block 228 is also shown. The electronic block 228 may be Si-based electronics fabricated on an Si substrate, diced, and physically bonded into the slider body 220 prior to a magnetic device process. In other implementations, the electronic block 228 may be prepared by a different process and include other compositions depending on the desired implementation.

Figure 2B:
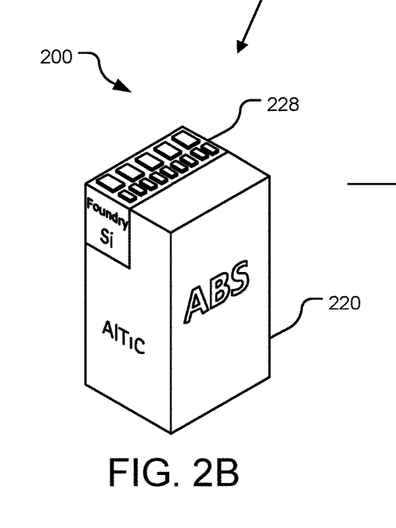

FIG. 2B illustrates the electronic block 228 embedded into the slider body 220 assembled for deposition and lithographical processing of functional layers. The functional layers may be a stack deposited on a surface of the slider body 220 including the surface of the electronic block 228. The stack may include a plurality of layers, including magnetic and non-magnetic layers.

Figure 2C:
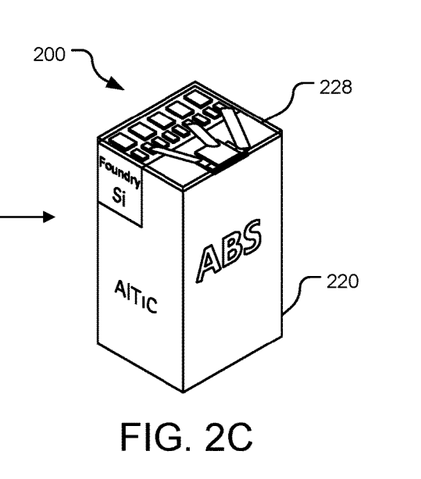

FIG. 2C illustrates functional layers deposited on the surface of the slider body 220 including the surface of the electronic block 228 embedded into the slider body 228 showing contact with external leads.

Figure 3A:
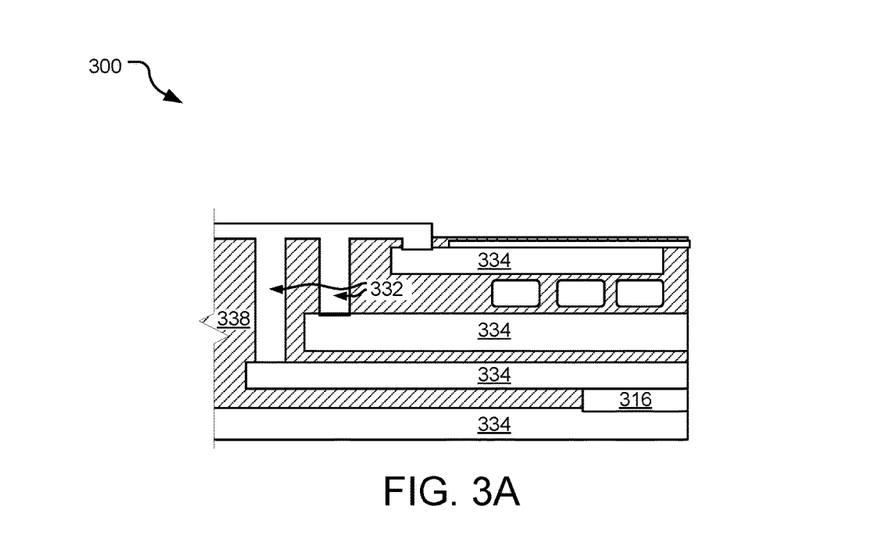
FIGS. 3A and 3B are schematic diagrams of a top view and a side view of an example slider body with monolithically integrated electronics.
Figure 3B:
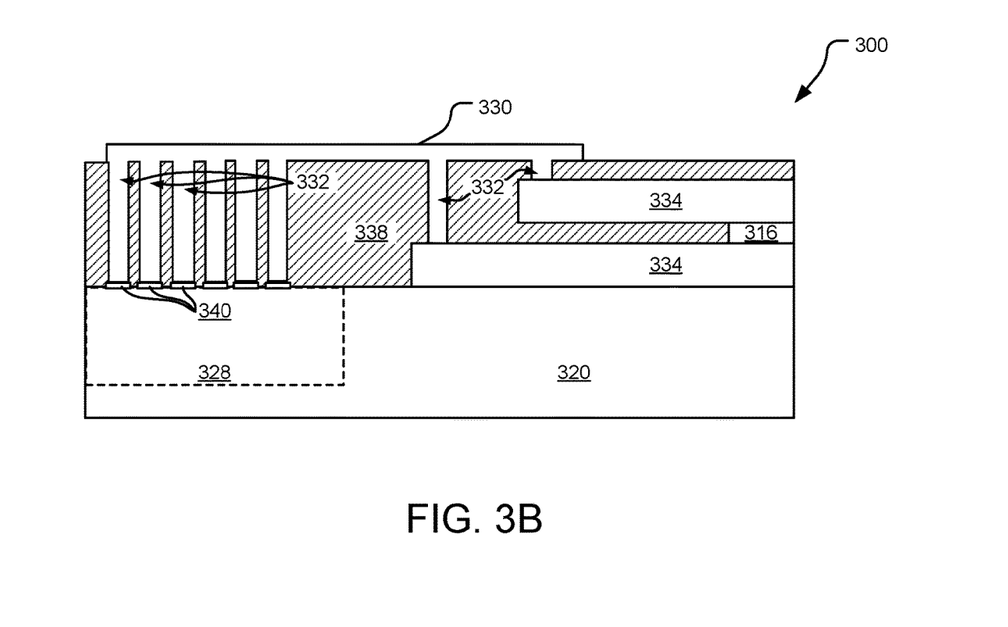

FIGS. 3A and 3B are schematic diagrams 300 of a top view and a side view of an example slider body 320 with monolithically integrated electronics. A top view of the slider body 320 is shown in FIG. 3A. A side view of the slider body 320 is shown in FIG. 3B.

The disclosed technology includes excising a void in a surface of the slider body (or substrate) 320, monolithically integrating an electronic block 328 into the void of the slider body 320, polishing a surface of the slider body 320 which includes the surface of the electronic block 328, and depositing functional layers (e.g., magnetic and non-magnetic layers) on the surface of the electronic block including the surface of the electronic block. The magnetic and non-magnetic layers (e.g., insulator 338, shields/leads 334) may be deposited adjacent a reader (e.g., a reader 316), a write coil, and a write pole. In some implementations, vias (e.g., vias 332) are integrated into an insulator (shown as insulator 338 and cross-hatched areas) and contact the electronic block 328 and the shields/leads 334. Leads 330 connect to the vias 332. Read/write and other electrical signals pass to and from processing electronics vias electrical wires and contact pads (e.g., contacts 340).

Figures 4A, 4B:
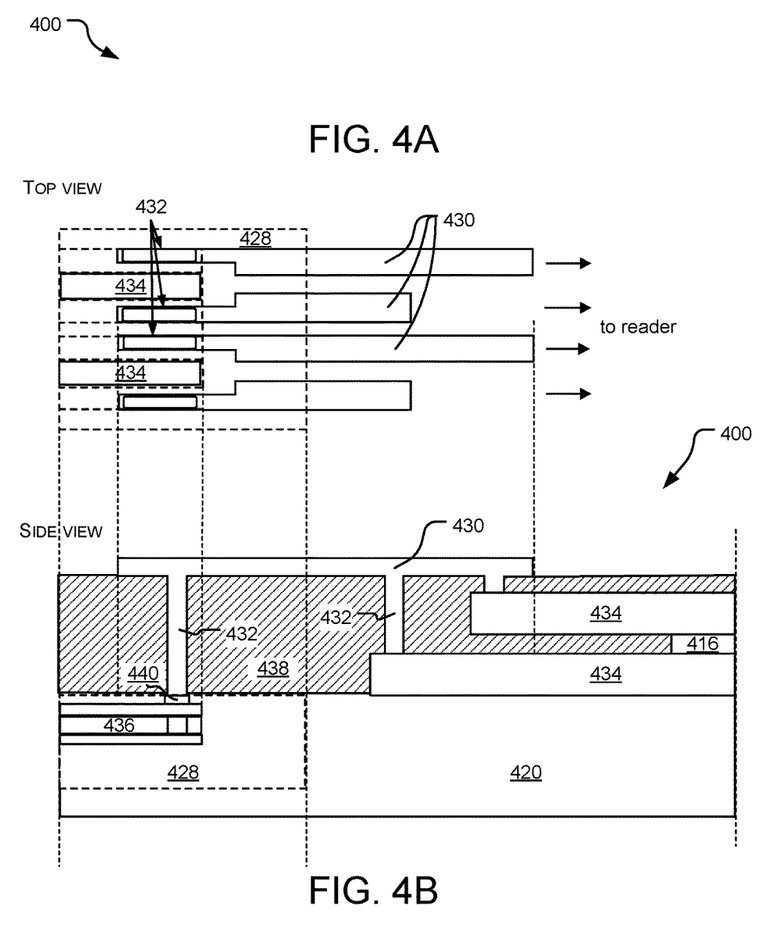
FIGS. 4A and 4B are schematic diagrams of a top view and a side view of an example slider body with monolithically integrated electronics.

FIGS. 4A and 4B are schematic diagrams 400 of a top view and a side view of an example slider body 420 with monolithically integrated electronics. A top view of the slider body 420 is shown in FIG. 4A. A side view of the slider body 420 is shown in FIG. 4B.

The disclosed technology includes excising a void in a surface of the slider body (or substrate) 420, monolithically integrating an electronic block 428 into the void of the slider body 420, polishing a surface of the slider body 420 which includes the surface of the electronic block 428, and depositing functional layers (e.g., magnetic and non-magnetic layers) on the surface of the electronic block including the surface of the electronic block. The magnetic and non-magnetic layers (e.g., an insulator 438, shields/leads 434) may be deposited adjacent a reader (e.g., reader 416). In some implementations, vias 432 are integrated into an insulator (shown as insulator 438 and cross-hatched areas) and contact the electronic block 428 and the shields/leads 434. Leads (e.g., leads 430) connect to the vias 432. Read/write and other electrical signals pass to and from processing electronics vias electrical wires and contact pads (e.g., contacts 440).

In FIGS. 4A and 4B, the implementation is an example of a lead and via layout 400 with integrated capacitive reactance. As shown, dielectrics 436 are an integrated capacitor which may be integrated into the electronics block 428 and connect via contacts 440 to a via 432.

Figure 5:
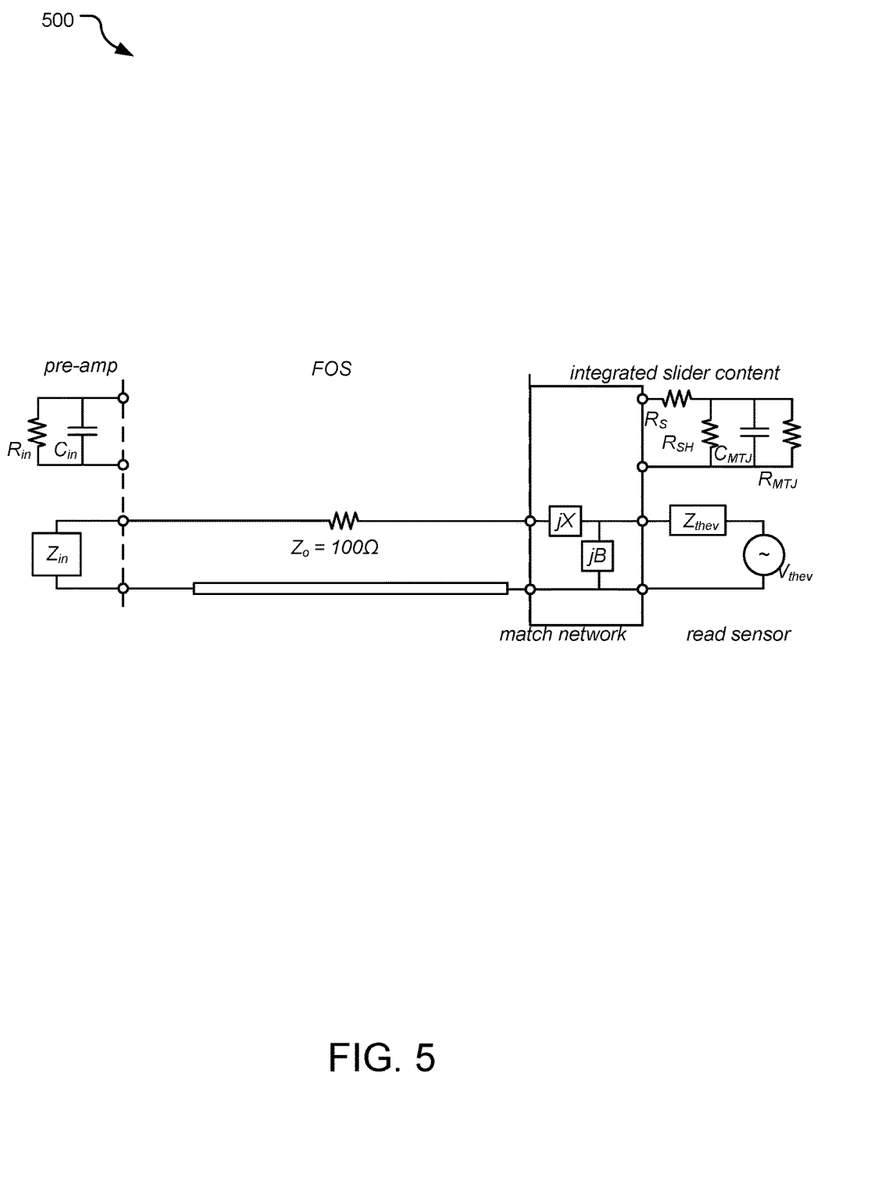
FIG. 5 illustrates a schematic diagram showing an example passive conjugate matching network implemented at the reader-flex on suspension junction for a slider body monolithically integrated with electronics.

FIG. 5 illustrates a schematic diagram 500 showing an example passive conjugate matching network implemented at the reader-flex on suspension junction for a slider body monolithically integrated with electronics. Specifically, FIG. 5 shows a lumped element circuit implementation of a conjugate or L-matching network at the reader-FOS junction. Other impedance matching solutions are also contemplated, such as an emitter/source-follower buffer transistor. In one implementation, the matching network may take the form of a pair of reactive elements that are designed to cancel the reactive component of the load (FOS+preamplifier) through a conjugate match, thereby enabling the highest power transfer across that junction and minimize the signal degradation along the signal chain.

As shown in FIG. 5, the reactive elements, jB and jX, are configured in an "L-section" and in qualitative terms is a function of the impedance of the FOS+preamp. For the realization of such a matching network where physical component values are required, a frequency may be selected at which the match is to be optimized and reactive component values (capacitance or inductance) may be calculated that lead to the conjugate match at the desired frequency. However, the calculations made allow the luxury of calculating matching values across the entire frequency spectrum.

The lumped element circuit has been shown to follow a simple parallel RC configuration as is shown in FIG. 4. The FOS has a characteristic impedance of 100Ω and the lumped element circuit for the reader takes the form shown in FIGS. 2 and 3. The reader impedance may be transformed into a Thevenin equivalent impedance that follows in Equation 1:

$$Z_{th} = R_S + \frac{(R_{mtj}R_{sh})(R_{mtj} + R_{sh})}{(R_{mtj} + R_{sh})^2 + (\omega C_{mtj}R_{mtj}R_{sh})^2} - \frac{j\omega C_{mtj}(R_{mtj}R_{sh})^2}{(R_{mtj} + R_{sh})^2 (\omega C_{mtj}R_{mtj}R_{sh})^2}$$ Equation 1 where $R_S$ is a series resistance element assumed to be negligible in the calculations made, $R_{mtj}$ is the magnetoresistance of the magnetic tunnel junction, $R_{sh}$ is the bias shunt, $\omega$ is the radian frequency, and $C_{mtj}$ is the intrinsic capacitance of the reader. The preamp input impedance, which acts as a load to the circuit arises as a parallel RC configuration and follows, $z_{pa}=R_{in}/(1+j\omega C_{in}R_{in})$. The FOS link acts as a preamp-terminated transmission line (TL) with a characteristic impedance of $Z_o=100\Omega$. The input impedance of the preamp-terminated FOS that follows in Equation 2:

$$Z_{in} = Z_o \frac{Z_{pa} + jZ_o\tan(\omega t_d l)}{Z_o + jZ_{pa}\tan(\omega t_d l)}$$ Equation 2 where $t_d$ is the transmission delay on the line and l is the length of the line. The matching network provides conjugate reactance elements, jB and jX, in a L-section configuration that cancels the reactive components of the Thevenin and loaded TL networks (Equations 1 and 2) such that the entire network manifests only as a real impedance (e.g., resistance), which is the requirement for maximum power transfer and minimization of signal loss/distortion (match criteria: $z_o=jX+(jB+1/(Z_{load}))^{-1}$).

Figure 6:
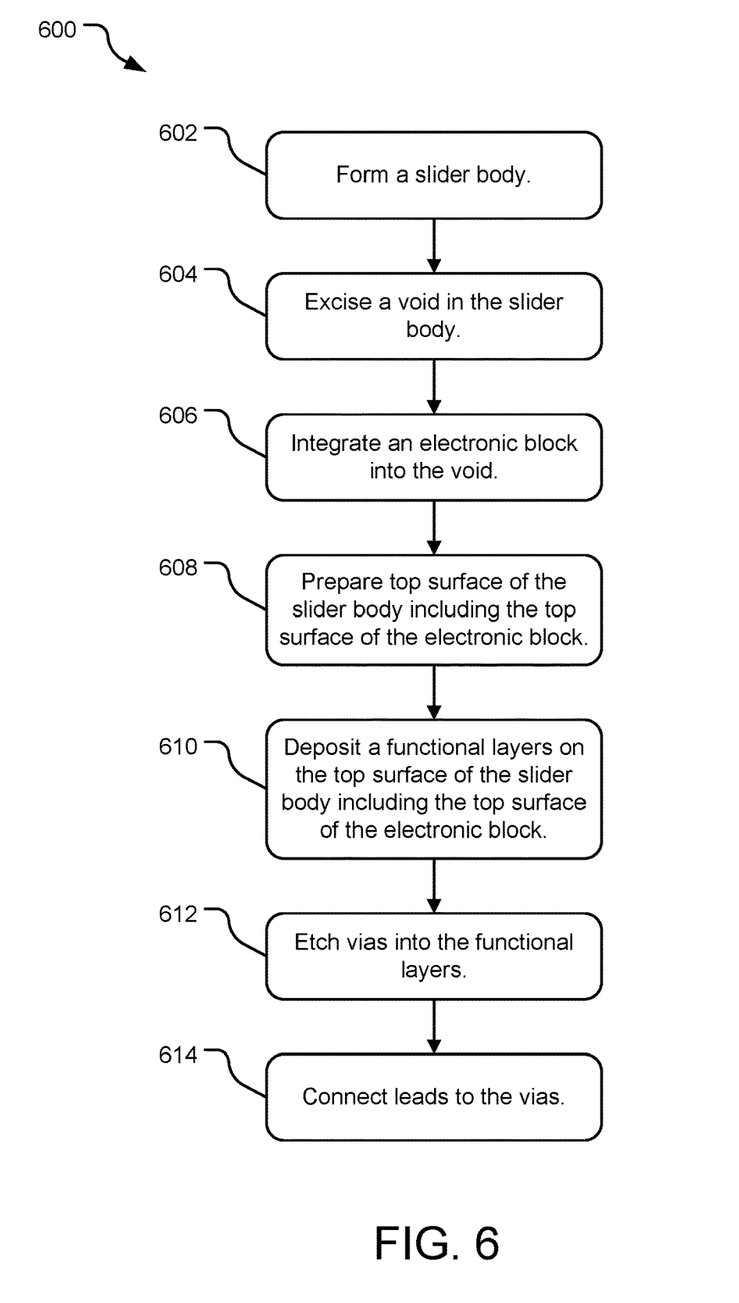
FIG. 6 illustrates example operations for making a slider body with monolithically integrated electronics.

FIG. 6 illustrates example operations 600 for making a slider body with monolithically integrated electronics. An operation 602 forms a slider body. A slider body may be a slider body or slider body substrate. The slider body may be made of AlTiC or other materials.

An operation 604 excises a void in a surface of the slider body. The void may be a notch, a hole, or any other area carved, cut, or removed to allow for electronics to be inserted into the slider body. The void may be a hole only accessible from the surface of the slider body, or the void may be a carved section of slider body that includes a portion of the surface of the slider body as well as the side of the slider body (as depicted in FIGS. 2A-2C). As shown in FIGS. 2A-2C, the void may be a carved section of slider body that includes a portion of the surface of the slider body as well as the side of the slider body that is opposite an air-bearing surface of the slider body. Other areas of placement within the slider body are contemplated.

An operation 606 monolithically integrates the electronic block into the void of the slider body. The electronic block may be integrated into the slider body prior to magnetic layer deposition and reader/writer fabrication. In some implementations, the electronic block is inserted into a void at the wafer level before slider dicing or individual head dicing. The electronic block may be monolithically integrated into the slider body by a bonding process or other attachment process.

The electronic block may be made of different components depending on the desired implementation. For example, the electronic block may include, without limitation, a reader or buffer amplifier/transistor, a writer amplifier/transistor, and passive matching networks that match the reader or writer impedance to the loaded FOS impedance. The electronic block may include a quarter wave transformer. The electronic block may include a switching and/or multiplexing network for MSMR or selectable dual reader (SDR) architectures, switching between reader and writer transducers, frequency detection electronics (frequency comparator, oscillator, etc.), and channel electronics (signal conditioning or processing) that may have advantages being closer to transducers.

In some implementations, the electronic block may include a conjugate matching network. For example, the electronic block may include a conjugate matching network implemented between the reader and the flex on suspension junction, as described in detail in FIG. 5.

In some implementations, the electronic block may include an analog-based frequency detection electronics for advanced reader technology. In some implementations, the electronic block may include correction circuitry for non-linearities. The electronic block may include reader buffer circuitry. Other compositions of the electronic block are contemplated.

An operation 608 prepares the surface of the slider body including the surface of the electronic block. Preparing the surface of the slider body may include polishing the surface of the slider body including the surface of the electronic block. Polishing may be performed by a chemical mechanical planarization operation.

After the surface of the slider body is prepared, functional layers (e.g., magnetic and non-magnetic layers and a reader) may be deposited in an operation 610. The magnetic and non-magnetic layers may vary. In some implementations, the magnetic and non-magnetic layers may include but are not limited to seed layers, insulating layers, and tunnel barrier layers, for example. An operation 612 builds electrical vias into the magnetic and non-magnetic layers. An operation 614 builds contact pads for connections between the electrical vias and the electronic block.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A magnetic recording head, comprising:
a slider body including:
a void excised in a surface of the slider body;
an electronic block monolithically integrated into the void of the slider body and including a conjugate matching network; and
one or more functional layers deposited on a surface of the slider body including a surface of the electronic block.

2. The magnetic recording head of claim 1, where the functional layers include magnetic and non-magnetic layers.

3. The magnetic recording head of claim 1, further comprising:
one or more contact pads in the electronic block.

4. The magnetic recording head of claim 3, further comprising:
one or more vias connected to the one or more contact pads and one or more leads connected to the one or more vias.

5. The magnetic recording head of claim 1, wherein the electronic block is monolithically integrated into the slider body prior to head fabrication.

6. The magnetic recording head of claim 1, wherein the electronic block is bonded into the slider body.

7. The magnetic recording head of claim 1, wherein the surface of the slider body is polished by chemical mechanical planarization.

8. The magnetic recording head of claim 1, wherein the conjugate matching network is implemented between a reader and a flex on suspension junction.

9. The magnetic recording head of claim 1, wherein the electronic block further includes at least one of multiplexing and switching networks for multiple sensor magnetic recording, an analog-based frequency detection electronics for advanced reader technology, correction circuitry for non-linearities, and reader buffer circuitry.

10. A magnetoresistive head assembly comprising:
a slider body comprising: a void excised in a surface of the slider body;
an electronic block monolithically integrated into the void of the slider body, the electronic block comprising at least one of a conjugate matching network, multiplexing and switching networks for multiple sensor magnetic recording, correction circuitry for non-linearities and reader buffer circuitry; and
one or more functional layers deposited on the surface of the slider body including a surface of the electronic block.

11. The magnetoresistive head assembly of claim 10, further comprising:
one or more contact pads connected to the electronic block.

12. The magnetoresistive head assembly of claim 11, further comprising:
one or more electrical vias connected to the one or more contact pads.

13. The magnetoresistive head assembly of claim 12, further comprising:
one or more leads connected to the one or more electrical vias.

14. The magnetoresistive head assembly of claim 10, wherein the electronic block comprises a conjugate matching network.

15. A slider body comprising:
a slider body substrate; a void excised in a surface of the slider body substrate;
a circuit block monolithically integrated in the void of the slider body substrate, comprising at least one of a conjugate matching network, multiplexing and switching networks for multiple sensor magnetic recording, correction circuitry for non-linearities, and reader buffer circuitry; and
one or more functional layers deposited on the surface of the slider body substrate including a surface of the circuit block.

16. The slider body of claim 15, further comprising:
one or more contact pads connected to the circuit block.

17. The slider body of claim 16, further comprising:
one or more electrical vias connected to the one or more contact pads.

18. The slider body of claim 17, further comprising:
one or more leads connected to the one or more electrical vias.

19. The slider body of claim 16, wherein the circuit block comprises
a conjugate matching network.

* * * * *